United States Patent [19]

Nakanishi et al.

[11] Patent Number: 5,709,763
[45] Date of Patent: Jan. 20, 1998

[54] RUGGED SHAPED SHEET AND PROCESS FOR MANUFACTURING SAME

[75] Inventors: Motoyasu Nakanishi, Fuji; Akira Takayama, Shimizu, both of Japan

[73] Assignee: Suzuki Sogyo Co., Ltd., Shizuoka, Japan

[21] Appl. No.: 582,897

[22] Filed: Jan. 4, 1996

Related U.S. Application Data

[62] Division of Ser. No. 328,458, Oct. 25, 1994, which is a division of Ser. No. 79,376, Jun. 21, 1993, Pat. No. 5,389,176.

[30] Foreign Application Priority Data

| Jun. 19, 1992 | [JP] | Japan | 4-185923 |
| Oct. 21, 1992 | [JP] | Japan | 4-307574 |
| Dec. 9, 1992 | [JP] | Japan | 4-351902 |
| Feb. 26, 1993 | [JP] | Japan | 5-62843 |
| Jun. 11, 1993 | [JP] | Japan | 5-166110 |

[51] Int. Cl.$^6$ .............................. B29C 41/18
[52] U.S. Cl. .............. 156/242; 156/245; 156/252; 156/277; 156/291; 427/259; 427/282
[58] Field of Search .................. 156/242, 245, 156/252, 277, 291; 427/282, 259

[56] References Cited

U.S. PATENT DOCUMENTS

| 2,264,628 | 12/1941 | Engert et al. | 156/291 |
| 4,076,567 | 2/1978 | Yoshikawa et al. | 427/282 |
| 4,183,978 | 1/1980 | Hefele | 156/291 |
| 4,324,815 | 4/1982 | Mitani et al. | 427/282 |
| 4,364,190 | 12/1982 | Yonkers | 36/32 R |
| 4,608,768 | 9/1986 | Cavanagh | 36/30 R |
| 4,986,496 | 1/1991 | Marentic et al. | 428/167 |
| 4,991,990 | 2/1991 | White | 428/167 |
| 5,244,620 | 9/1993 | Uchiyama | 427/282 |
| 5,389,176 | 2/1995 | Nakanishi et al. | 427/259 |

FOREIGN PATENT DOCUMENTS

| 357280 | 2/1929 | Belgium. | |
| 2323521 | 4/1977 | France. | |
| 2351405 | 4/1975 | Germany | 156/291 |

OTHER PUBLICATIONS

Asics Corp., Patent Abstracts of Japan, vol. 14, No. 106, (C–0694), Feb. 27, 1990.

*Primary Examiner*—Donald Loney
*Attorney, Agent, or Firm*—Wenderoth, Lind & Ponack

[57] ABSTRACT

A rugged shaped sheet capable of exhibiting improved non-slip properties and aesthetic properties and a process for manufacturing the same. The rugged shaped sheet includes a base sheet member and a rugged pattern of a predetermined shape adhered to the base sheet member. The rugged pattern is formed of a plurality of pattern elements different in size, configuration and/or properties into a multi-layer structure. The rugged shaped sheet is manufactured by pouring an elastomer liquid material into each of perforated plates, semicuring the elastomer and laminating the perforated plates on each other, resulting in forming the rugged pattern of a predetermined shape on the base sheet member.

10 Claims, 13 Drawing Sheets

F I G. 10A
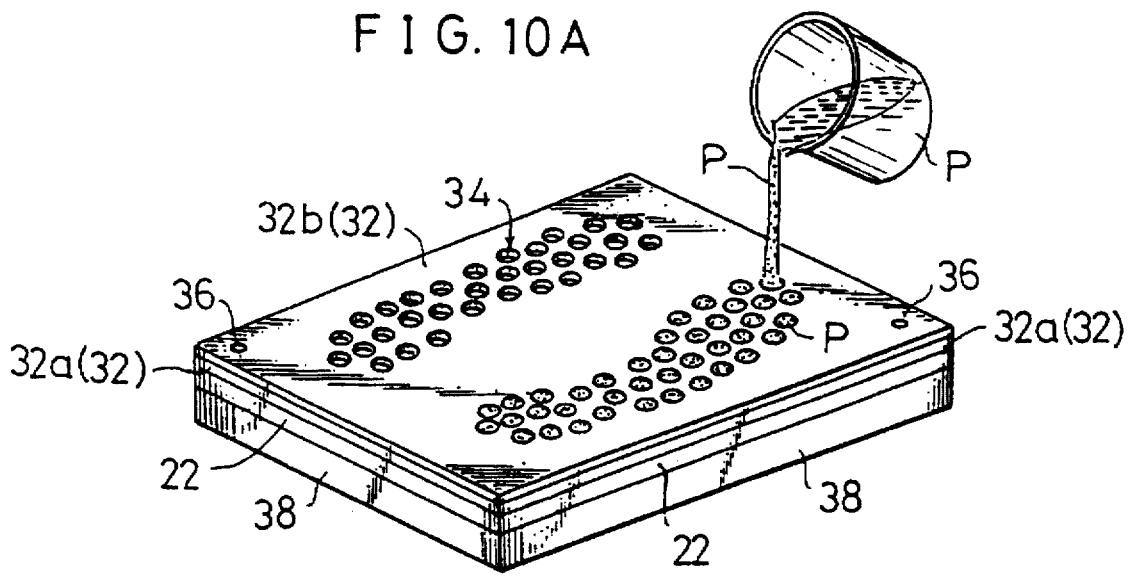
F I G. 10B
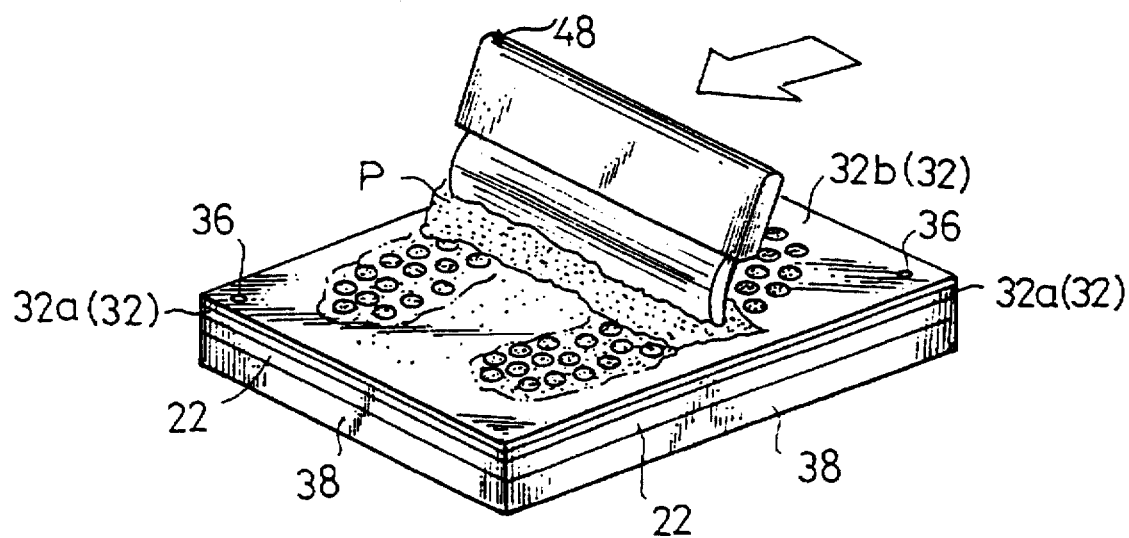

RUGGED SHAPED SHEET AND PROCESS FOR MANUFACTURING SAME

This is a divisional application of Ser. No. 08/328,458 filed Oct. 25, 1994, pending, which is a divisional application of Ser. No. 08/079,376, filed Jun. 21, 1993, now U.S. Pat. No. 5,389,176.

BACKGROUND OF THE INVENTION

This invention relates a sheet formed into a rugged shape (hereinafter referred to as "rugged shaped sheet") and a process for manufacturing the same, and more particularly to a rugged shaped sheet improved in non-slip and aesthetic properties and a process for manufacturing the same.

Conventionally, it has been attempted that sneakers or sports shoes used as jogging shoes, basketball shoes, tennis shoes or the like are constructed into a multi-layer structure by forming an outer sole which is a lowermost layer of a shoe sole contacted with the ground or a floor of a solid rubber material or a high-density sponge material and laminating at least one sponge sheet of a light-weight material exhibiting satisfactory cushioning properties such as ethylene vinyl acetate (EVA) on the outer sole, to thereby accomplish a decrease in weight and an improvement in shock absorbing properties.

The solid rubber or high-density sponge is relatively rigid and exhibits satisfactory ground gripping properties and wear-resistant properties; however, it is increased in weight, to thereby fail to reduce the weight of the shoes.

In view of such a problem, various kinds of techniques of forming a satisfactory shoe sole while improving a material for the shoe sole are proposed. For example, there is proposed a method wherein a polyurethane resin film like a nonwoven sheet and a liquid polyurethane compound for forming non-slip projections are put in a mold and then subjected to thermal cure, resulting in being integrally bonded. The method proposed is disclosed in Japanese Patent Application Laid-Open Publication No. 310601/1989. Another method which is likewise proposed comprises the steps of arranging a perforated plate on a nonwoven fabric material to keep both intimately contacted with each other, pouring a polyurethane elastomer material containing a thickening agent into the perforated plate, carrying out a squeezing treatment with respect to the elastomer and heating the elastomer to cure it, resulting in forming an embossed sheet. The method is entitled "a method, for manufacturing an embossed sheet" and is disclosed in Japanese Patent Application Laid-Open Publication No. 185822/1992 by the assignee.

Unfortunately, an improvement in the material for the shoe sole taught in the proposed methods is insufficient to provide the shoe sole with satisfactory non-slip properties. In order to permit the shoe sole to exhibit increased non-slip properties, it is further required to consider other factors in addition to the material for the shoe sole, such as, for example, a height of a rugged pattern formed on the sole of the sports shoes, an area of the rugged pattern contacted with the ground, a configuration of a surface of the rugged pattern contacted with the ground, arrangement of the pattern and the like. However, consideration of the factors causes a configuration of the rugged pattern to be complicated. Therefore, manufacturing of the shoe sole with the rugged pattern of such a complicated configuration by means of a mold as proposed in Japanese Patent Application Laid-Open Publication No. 310601/1988 causes a manufacturing cost of the mold to be extensively increased.

Also, the above-described method proposed in Japanese Patent Application Laid-Open Publication No. 185922/1992 by the assignee wherein a rugged pattern is formed by the single perforated plate is conveniently applied when a configuration of the rugged pattern is relatively simple, however, it is not suitable for the rugged pattern of such a complicated configuration as described above.

Further, a rugged pattern formed on a sole of sports shoes is generally made of the same material as the sole in a manner to be integral with the sole. It is often desired to locally vary properties of the rugged pattern in order to enhance the non-slip properties and aesthetic properties of the sole. However, the above-described formation of the rugged pattern integral with the sole fails to significantly vary the properties of the rugged pattern.

SUMMARY OF THE INVENTION

The present invention has been made in view of the foregoing disadvantage of the prior art.

It is an object of the present invention to provide a rugged shaped sheet which is capable of satisfactorily providing a shoe sole with both non-slip properties and aesthetic properties.

It is another object of the present invention to provide a process for manufacturing a rugged shaped sheet which is capable of easily manufacturing a rugged shaped sheet which provides a shoe sole with non-slip properties and aesthetic properties while preventing the manufacturing cost from being increased.

In accordance with one aspect of the present invention, a rugged shaped sheet is provided. The rugged shaped sheet includes a base sheet member and a rugged pattern of a predetermined shape adhered to the base sheet member. The rugged pattern comprises a combination of a plurality of pattern elements which are formed so as to be different in at least one of size, configuration and properties from each other.

In a preferred embodiment, the rugged shaped sheet is used to constitute an outer sole which forms a lowermost layer of a shoe sole.

In another preferred embodiment of the present invention, the rugged pattern has a ground surface generally formed into a concave shape, wherein the ground surface has a periphery formed at an acute angle with respect to a side surface of the rugged pattern.

In another preferred embodiment of the present invention, the pattern elements of the rugged pattern have colors applied thereto in such a manner that the colors are different between each two of the pattern elements which are arranged so as to be adjacent to each other in at least a vertical direction.

In another preferred embodiment of the present invention, the pattern elements of the rugged pattern are formed so as to be different in size or combination of size and configuration from each other, resulting in the rugged pattern being formed into a stepwise configuration.

Thus, in the rugged shaped sheet of the present invention constructed as described above, the rugged pattern is constituted by the plural pattern elements which are formed so as to be different in at least one of size, configuration and properties from each other, resulting in being constructed into a multi-layer structure. Such construction permits the rugged pattern to be provided thereon with a strip-like color design when different colors are applied to the pattern elements, respectively, to thereby improve aesthetic properties of the rugged shaped sheet. Also, when the pattern elements of the rugged pattern are formed so as to be different in size or combination of size and configuration from each other, resulting in the rugged pattern being formed into a stepwise configuration, the rugged pattern may be formed into a more complicated configuration sufficient to further improve the aesthetic properties.

In accordance with another aspect of the present invention, a process for manufacturing a rugged shaped sheet is provided. The process comprises the steps of arranging a base sheet member on a base, arranging, on the base sheet member, perforated plates formed with perforations of a predetermined shape in a pattern-like manner, pouring an elastomer liquid material into the perforations of each of the perforated plates, subjecting the elastomer liquid material to a squeegee treatment; and curing the elastomer liquid material. In the process, at least two such perforated plates including a base-side perforated plate and a ground-side perforated plate each formed with said perforations are provided; the base-side perforated plate is first arranged on the base sheet member; the elastomer liquid is poured in a predetermined amount into the perforations of the base-side perforated plate, subjected to the squeegee treatment and then semicured, resulting in forming a base layer; the ground-side perforated plate is arranged on the base layer thus formed; the elastomer liquid material is poured in a predetermined amount into the perforations of the ground-side perforated plate, subjected to the squeegee treatment and cured to a degree sufficient to permit the elastomer liquid material to be removed from the ground-side perforated plate, resulting in forming a ground layer; the perforated layers are removed from the cured elastomer liquid material in turn subsequent to formation of the ground layer, to thereby obtain a combination of the base sheet member and a rugged pattern of a predetermined configuration adhesively formed on the base sheet member; and the combination is fully cured to form the rugged shaped sheet.

In a preferred embodiment of the present invention, the perforated plates further include at least one intermediate perforated plate likewise formed with perforations, wherein the intermediate perforated plate is arranged on the base layer after formation of the base layer; the elastomer liquid material is poured into the perforations of the intermediate perforated plate, subjected to a squeegee treatment and semicured, resulting in forming an intermediate layer; the elastomer liquid material is also poured into, if present, at least one additional intermediate perforated plate, subjected to the squeegee treatment and then semicured, to thereby form at least one intermediate layer; and the ground-side perforated plate is arranged on the intermediate layer thus formed, to thereby form the ground layer.

In accordance with this aspect of the present invention, a process for manufacturing a rugged shaped sheet is provided. The process comprises the steps of arranging, on a base, perforated plates formed with perforations of a predetermined shape in a pattern-like manner; pouring an elastomer liquid material into the perforations of each of the perforated plates, followed by a squeegee treatment; arranging a base sheet member on the perforated plates and holding the former on the latter while downwardly pressing, leading to curing of the elastomer liquid material. In the process, the perforated plates include at least a base-side perforated plate and a ground-side perforated plate; the ground-side perforated plate is first put on the air-permeable sheet and charged with the elastomer liquid material in a predetermined amount; the elastomer liquid material poured in the ground-side perforated plate is subjected to the squeegee treatment and then semicured, leading to formation of a ground layer; and a base layer is laminated on the ground layer.

In a preferred embodiment of the present invention, arrangement of the ground-side perforated plate on the base is carried out by arranging the air-permeable sheet on the base, arranging the ground-side perforated plate on the air-permeable sheet after, if necessary, application of a parting agent to the base, and then arranging the ground-side perforated plate on the base.

In another preferred embodiment of the present invention, lamination of the base layer on the ground layer is carried out by arranging the base-side perforated plate on the ground layer at the time when the ground layer is formed and arranging the base sheet member on the base layer at the time when the elastomer liquid material is semicured to form the base layer.

In another preferred embodiment of the present invention, lamination of the base layer on the ground layer further includes arrangement of an intermediate product formed by laminating an additional base layer on an additional base sheet member in a different step on the ground layer at the time when the ground layer is formed.

In another preferred embodiment of the present invention, the perforated plates further include at least one intermediate perforated plate likewise formed with perforations, wherein the intermediate perforated plate is arranged on the ground layer after formation of the ground layer; the elastomer liquid material is poured into the perforations of the intermediate perforated plate, subjected to a squeegee treatment and semicured, resulting in forming an intermediate layer; and the base-side perforated plate is arranged on the intermediate layer thus formed, to thereby form the ground layer.

In another preferred embodiment of the present invention, the perforations of each of the perforated plates are formed by etching.

Thus, in the process of the present invention, the rugged pattern is successively formed from the base side or ground side, so that the properties, size and/or configuration of the pattern elements may be varied.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout, wherein:

FIG. 5B (ii) is a schematic fragmentary vertical sectional view showing a perforated plate comprising a single thick plate element;

FIGS. 10A is a perspective view showing one example of formation of a ground-side pattern element in a process of the present invention in which a base sheet member is previously arranged prior to formation of a rugged pattern;

FIG. 10B is a perspective view showing a squeegee treatment carried out with respect to the ground-side pattern element shown in FIG. 10A;

DETAILED DESCRIPTION OF THE PREFERRED EMBODIMENTS

Now, the present invention will be described hereinafter with reference to the accompanying drawings.

The following description on a rugged shaped sheet and a method for manufacturing the same according to the present invention will be made by way of an example of a sole of sports shoes. Also, the description will be made in connection with a rugged shaped sheet, perforated plates used in manufacturing of the rugged shaped sheet, manufacturing of the perforated plates and manufacturing of the rugged shaped sheet in order.

Construction of Rugged Shaped Sheet

Figure 1:
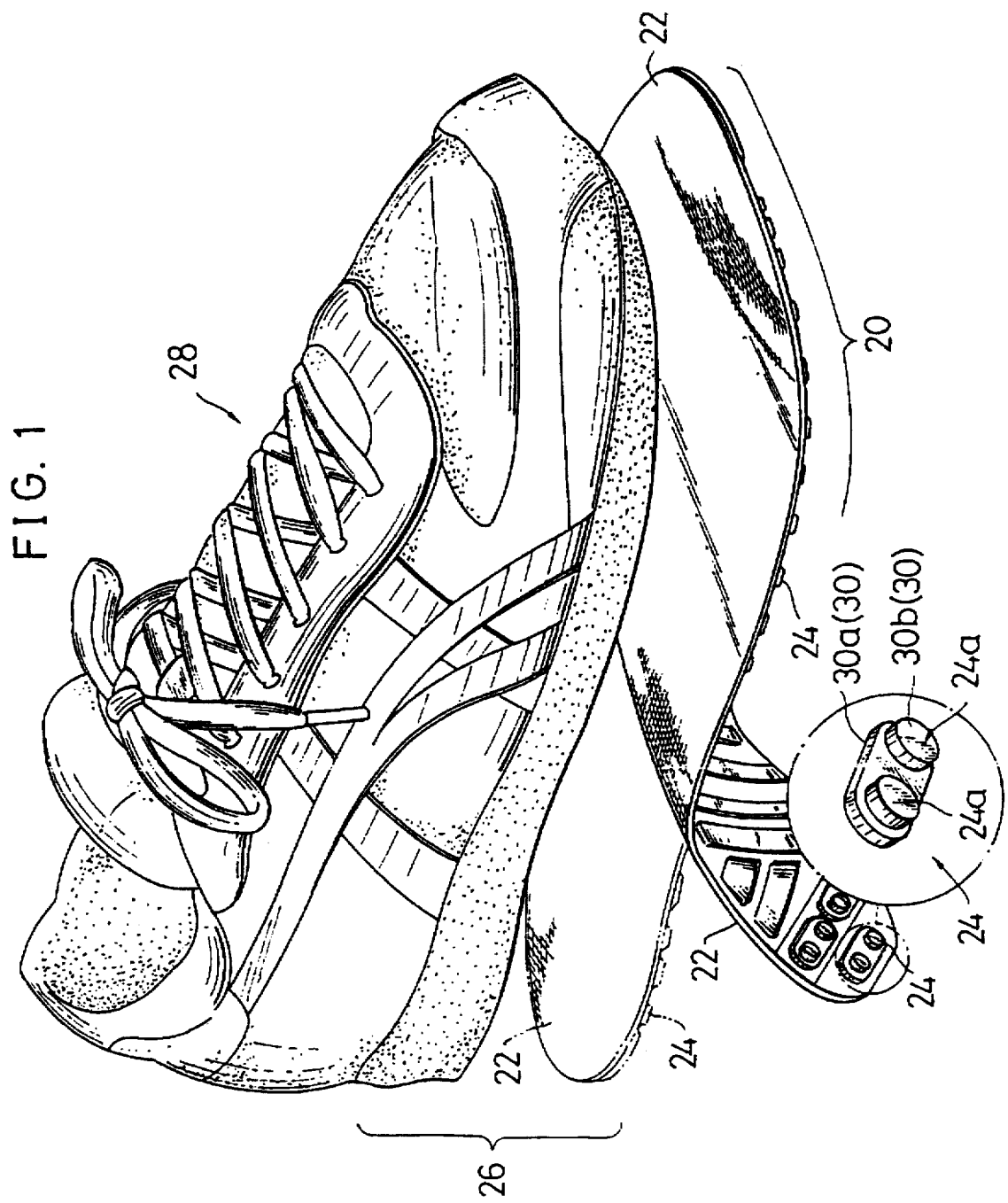
FIG. 1 is an exploded perspective view showing an example of sports shoes to which an embodiment of a rugged shaped sheet according to the present invention is applied.

Referring first to FIG. 1, an example of sports shoes to which an embodiment of a rugged shaped sheet according to the present invention may be applied is illustrated. A rugged shaped sheet of the illustrated embodiment which is generally designated at reference numeral 20 generally includes a base sheet member 22 and a rugged pattern 24 of a predetermined shape arranged in a pattern-like manner on the the base sheet member 22 while being kept adhered to the base sheet member 22. The base sheet material 22 is cut into a shape in conformity to a sole of sports shoes 28 and the rugged pattern 24 is formed into a predetermined shape so as to provide the sports shoes 28 with non-slip properties. The rugged pattern 24 thus formed is then intimately joined or adhered to the base sheet member 22, resulting in the rugged shaped sheet 20.

The base sheet material 22 may be made of any suitable material conventionally used for a base material of an outer sole of sports shoes, such as, for example, a synthetic resin material, a rubber material, a nonwoven fabric material or the like. When a nonwoven fabric material is used for the base sheet material 22, a thermoplastic fiber material or a thermosetting fiber material may be conveniently directed to this purpose. For example, the nonwoven fabric material may include an artificial leather like a back skin which is sold under "ECSAINE" (Registered Trademark) from Toray Kabushiki Kaisha, Japan. The artificial leather may be commercially available in various kinds of colors, therefore, the shoe sole 26 may be provided with a design of any desired color contrast while applying a black color or a color similar thereto to the rugged pattern 24.

In addition, any other suitable material such as a conventional nonwoven fabric sheet material having satisfactory peeling or tearing strength, tensile strength and resistance to wear, a film sheet material of an increased thickness, or the like may be conveniently used for this purpose. Further, the material may have adhesive properties or be coated with a resin film. The conventional nonwoven fabric material which is conveniently used may include a nonwoven fabric material having elastic long fibers such as urethane or the like bonded thereto by autohesion. In this instance, application of a nonwoven fabric sheet having a thickness as large as about 1 cm permits the sole 26 to be provided with satisfactory cushioning properties. Use of such a film sheet as described above for the base sheet member 22 causes expression of material contrast between the rugged pattern 24 and the base sheet material 22 as a design to be rendered difficult as compared with the above-described artificial leather or nonwoven fabric material. However, it significantly increases color contrast between both.

Further, when resin cured by ultraviolet rays is used as an elastomer liquid material P (FIGS. 2A and 2B) for forming the rugged pattern 3, it is also possible to print a pattern design corresponding to the rugged pattern 24 on the base sheet member 22. This permits colors of the pattern design printed on the base sheet material 10 to be visually observed by forming the rugged pattern of a transparent or semitransparent material, resulting in the shoe sole being provided with aesthetic properties different from the above.

Also, various kinds of color contrast may be selected between the base sheet material 22 and the pattern design printed on the base sheet material. For example, black is employed for the base sheet member 22, whereas a bright color such as yellow, an orange color or the like is employed for ink printed on the base sheet member 22. Alternatively, employment of colors which are different in chroma, brightness, hue or any combination thereof for the base sheet member 22 and the ink for the pattern design printed on the base sheet member 22 may permit the color of the ink to be prominent relative to the color of the base sheet member 22 in color contrast between both. For example, red and blue may be employed for the base sheet member 22 and the ink for this purpose, respectively.

Now, the rugged pattern 24 will be more detailedly described hereinafter.

The rugged pattern 24 constitutes one of the features of the present invention. The rugged pattern 24 is constructed into a multi-layer structure by laminatedly combining a plurality of pattern elements 30 formed so as to be different in at least one of a size, a configuration and properties thereof. When it is required to distinguish such plural pattern elements 30 from each other for the sake of description of the present invention, a pattern element directly tightly joined to the base sheet member 22 and an uppermost pattern element will be indicated to be a base-side pattern element 30a and a ground-side pattern element 30b, respectively.

The number of layers of the rugged pattern 24 formed by the pattern elements 30 is at least two. When the number of layers is selected to be two, the rugged pattern 24 is constituted by the base-side pattern element 30a and ground-side pattern element 30b described above. Also, when the rugged pattern 24 comprises three such pattern elements 30, the elements 30 are the above-described base-side pattern element 30a and ground-side pattern element 30b, as well as one intermediate pattern element 30c interposedly located between the pattern elements 30a and 30b as shown in FIG. 7 which will be described hereinafter. Further, when the number of layers of the rugged pattern 24 is four or more, two or more such intermediate pattern elements 30c are arranged between the base-side pattern element 30a and the ground-side pattern element 30b.

Now, supposing that the number of layers of the rugged pattern 24 is two, the rugged pattern 24 will be described hereinafter with reference to FIGS. 2A to 4C. FIGS. 3A to 3C each show a rugged pattern 24 manufactured according to a first procedure in FIG. 2A wherein a base sheet member 22 is previously arranged and then perforated plates 32 are laminated on the base sheet member 22 in turn. The first procedure causes a squeegee-treated surface to appear on the side of a surface of the rugged pattern 24 which is contacted with the ground (hereinafter referred to as "ground surface"). The ground surface is designated at reference character 24a. Therefore, the ground surface 24a is formed into a gentle concave shape, so that an outer periphery of the ground surface 24a upwardly somewhat projects at an acute angle along a side surface of the pattern as shown in FIGS. 3A to 3C. Such configuration of the rugged pattern 24 permits it to exhibit increased ground gripping properties and non-slip properties. FIGS. 4A to 4C each show a rugged pattern 24 manufactured according to a second procedure shown in FIG. 2B wherein perforated plates 32 are laminated on each other in turn and then a base sheet member 22 is set. The second procedure causes a squeegee-treated surface to appear at a joint area between pattern elements or at a joint area between the rugged pattern and the base sheet member 22. Therefore, a ground surface 24a is rendered flat as shown in FIGS. 4A to 4C. Nevertheless, arrangement of a breathable or air-permeable sheet 40 as described hereinafter permits the ground surface to be prevented from being contacted with the air, resulting in unnecessary luster which deteriorates texture of the sole 26 being effectively eliminated.

Figure 2A:
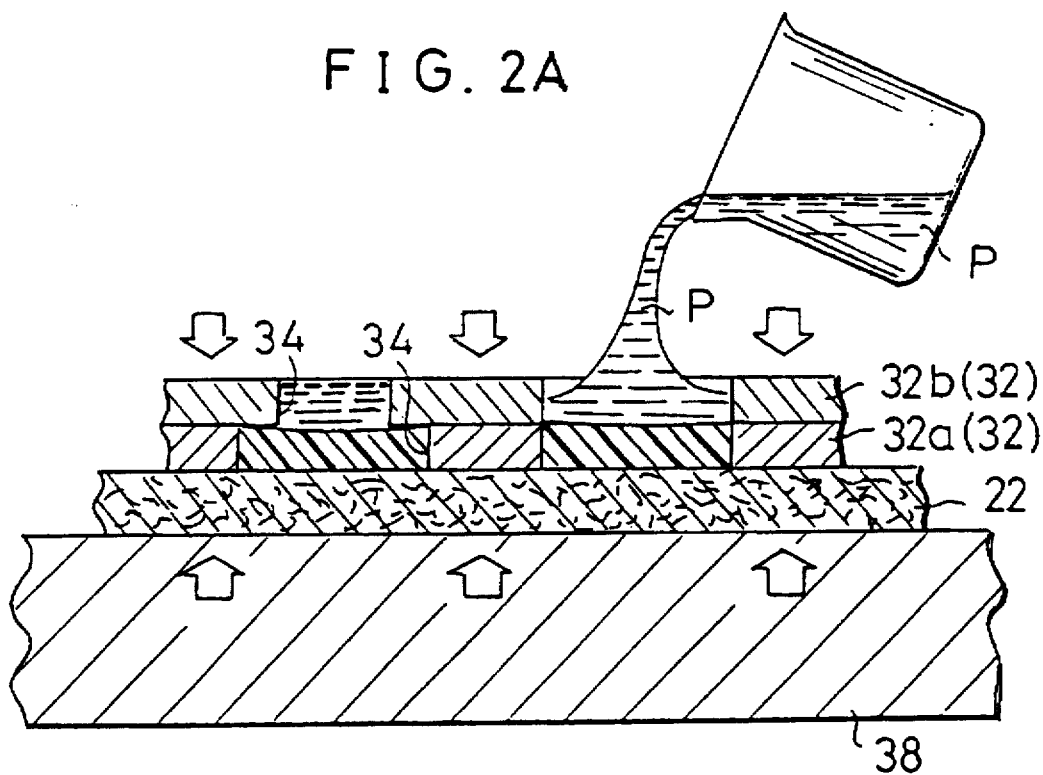
FIG. 2A is a fragmentary vertical sectional view showing an intermediate step in an embodiment of a method for manufacturing a rugged shaped sheet according to the present invention.
Figure 2B:
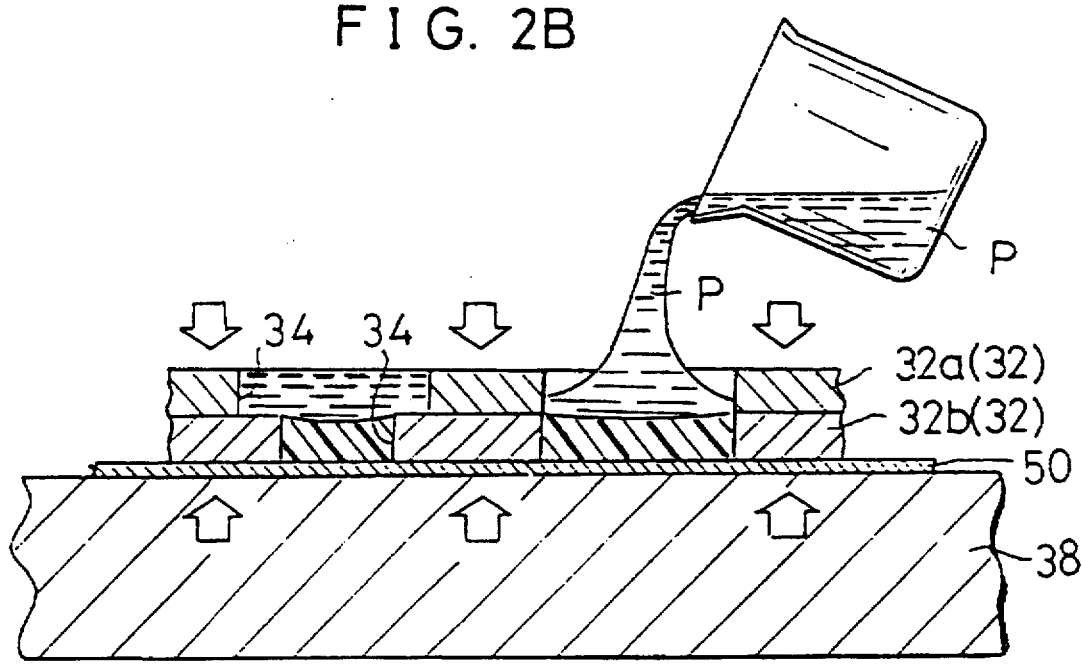
FIG. 2B is a fragmentary vertical sectional view showing an intermediate step in another embodiment of a method for manufacturing a rugged shaped sheet according to the present invention.
Figure 3A:
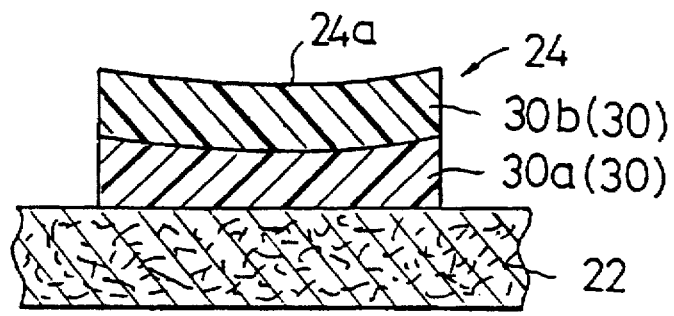
FIGS. 3A to 3C each are a fragmentary vertical sectional view showing an example of a rugged shaped sheet manufactured according to the method shown in FIG. 2A.
Figure 3B:
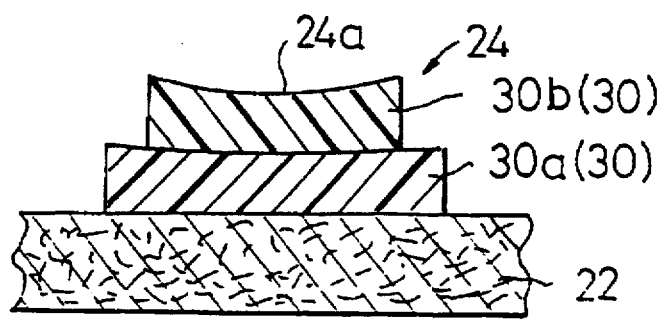
Figure 3C:
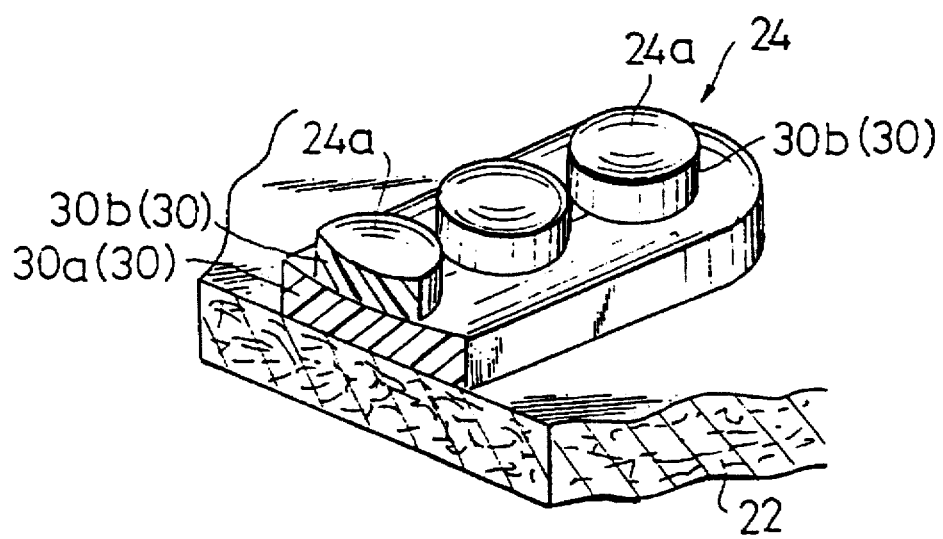
Figure 4A:
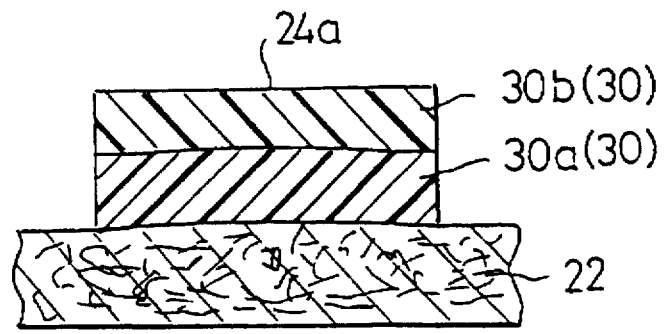
FIGS. 4A to 4C each are a fragmentary vertical sectional view showing an example of a rugged shaped sheet manufactured according to the method shown in FIG. 2B.
Figure 4B:
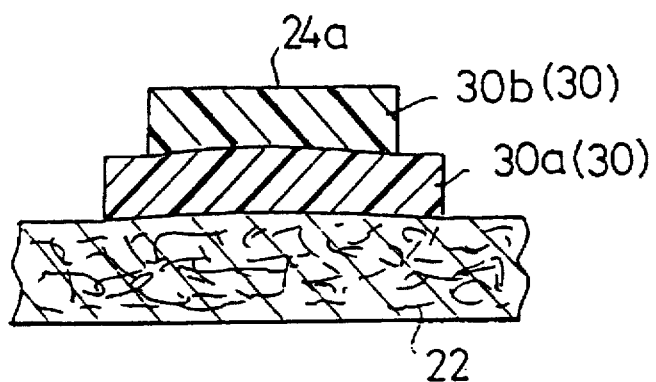
Figure 4C:
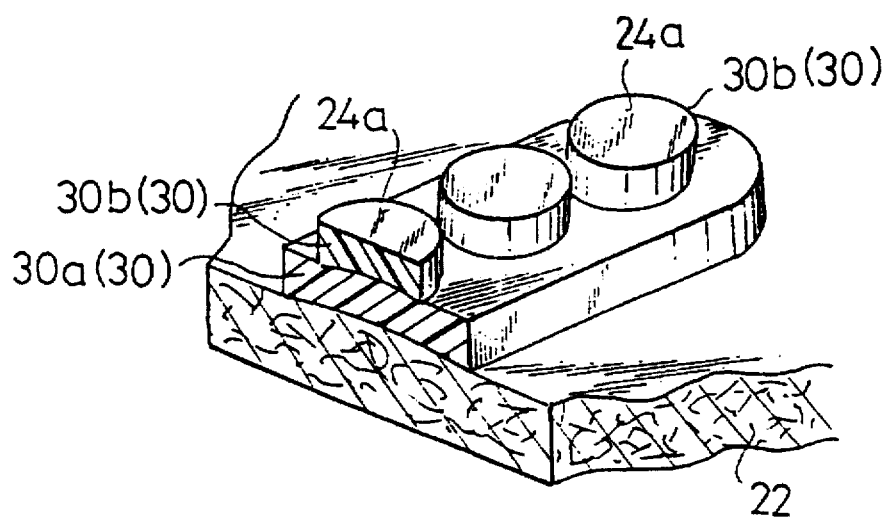

The rugged patterns 24 of FIGS. 3A to 3C prepared in the manner shown in FIG. 2A each are constructed by pattern elements 30 different in at least one of size, configuration and/or properties from each other, respectively. Also, the pattern elements 30 constituting each of the rugged patterns 24 of FIGS. 4A to 4C manufactured as shown in FIGS. 2B are formed so as to be likewise different in size, configuration and/or properties from each other, respectively. More particularly, in each of the rugged patterns 24 shown in FIGS. 3A and 4A, the pattern elements 30a and 30b have applied thereto colors different from each other while being formed into the same size and configuration. More specifically, a color of the base-side pattern element 30a is rendered somewhat deep as compared with that of the ground-side pattern element 30b.

Arrangement of colors of the pattern elements 30 is not limited to the above-described manner, so long as colors of the pattern elements 30 vertically laminated on each other are rendered different from each other. Therefore, when three or more such pattern elements 30 are provided, two kinds of colors different in hue, brightness and/or chroma may be alternately arranged to provide the pattern elements with a stripe-like design. Further, it is possible to render the pattern elements colorless or colored and transparent. Alternatively, a fluorescent color may be mixed with or substituted for the above-described colors of the pattern elements 30.

The properties of the pattern elements 30 which may be rendered different between the pattern elements 30 may include hardness, elasticity, a shock absorbing capability, luster, satinizing and the like.

The pattern elements 30 constituting each of the rugged patterns 24 of FIGS. 3B and 4B respectively manufactured as shown in FIGS. 2A and 2B are formed into sizes which are gradually decreased in turn, so that the rugged pattern 24 is formed in a stepwise manner. A manner in which a size of the pattern elements 30 is varied is not limited to the above so long as the perforated plates 32 can be removed from the pattern elements 30.

The pattern elements 30 constituting each of the rugged patterns 24 of FIGS. 3C and 4C respectively manufactured as shown in FIGS. 2A and 2B are formed so as to be different in configuration as well as size from each other. More particularly, in the pattern elements 30 shown in each of FIGS. 3C and 4C, the base-side pattern element 30a is formed into an elliptic shape in plane and the ground-side pattern element 30b is formed into a circular shape in plane and laminatedly arranged on the base-side pattern element 30a. A combination of size and configuration of the pattern elements 30 is not limited to the above. For example, such properties of the pattern elements 40 as shown in FIGS. 3A and 4A may be incorporated in the pattern elements shown in FIGS. 3C and 4C, so that the rugged pattern 24 may be widely varied in various ways. Materials for the rugged pattern 24 will be detailedly described hereinafter.

Construction and Preparation of Perforated Plates

Now, construction and preparation of the perforated plates 32 used for manufacturing the rugged shaped sheet 20 of the present invention constructed as described above will be described hereinafter.

The perforated plates 32 used in the present invention each are formed into a somewhat small thickness. This is for the reason that a plurality of the perforated plates 32 are laminatedly used for manufacturing the rugged shaped sheet; therefore, it is required to reduce a thickness of the perforated plates in view of a relationship between a height of the rugged pattern 24 and the number of perforated plates 32 and a variation in attraction force between the perforated plates 32 depending on the size and/or configuration of the rugged patterns 24 and a procedure for forming the rugged pattern 24. For example, supposing that two such perforated plates 32 are used to form the rugged pattern 24 of a two-layer structure comprising the base-side pattern element 30a and ground-side pattern element 30b, such a thickness of each of the perforated plates 25 as shown in Table 1 may be employed. In Table 1, the designation "Pre-arrangement of Base Sheet Member" indicates that the base sheet member 22 is previously arranged and then the perforated plates 32 are laminated on the base sheet member 22 in order. Likewise, the designation "Post-arrangement of Base Sheet Member" indicates that the perforated plates 32 are laminated on each other and then the base sheet member 22 is arranged. The designations used have the same meanings throughout the specification. Therefore, the pre-arrangement of the base sheet member 22 corresponds to the procedure shown in FIGS. 2A and the post-arrangement of the base sheet member 22 corresponds to the procedure shown in FIG. 2B.

Also, in Table 1, the designation "Upper Plate" indicates the perforated plate which is positioned on an upper side in each of the procedures shown in FIGS. 2A and 2B and the designation "Lower Plate" indicates the perforated plate positioned on the lower side. Therefore, in the pre-arrangement of the base sheet member shown in FIG. 2A. "Upper Plate" constitutes a ground-side perforated plate 32b for forming the ground-side pattern element 30b and "Lower Plate" constitutes a base-side perforated plate 32a for forming the base-side pattern element 30a; whereas, in the post-arrangement of the base sheet member shown in FIG. 2B, "Upper Plate" constitutes the base-side perforated plate and "Lower Plate" constitutes the ground-side perforated plate.

TABLE 1

| Perforated Plate | Pre-arrangement of Base Sheet Member | Post-arrangement of Base Sheet Member |
| --- | --- | --- |
| Upper Plate | 2.0 mm | 1.6 mm |
| Lower Plate | 1.3 mm | 1.4 mm |

Figure 5A:
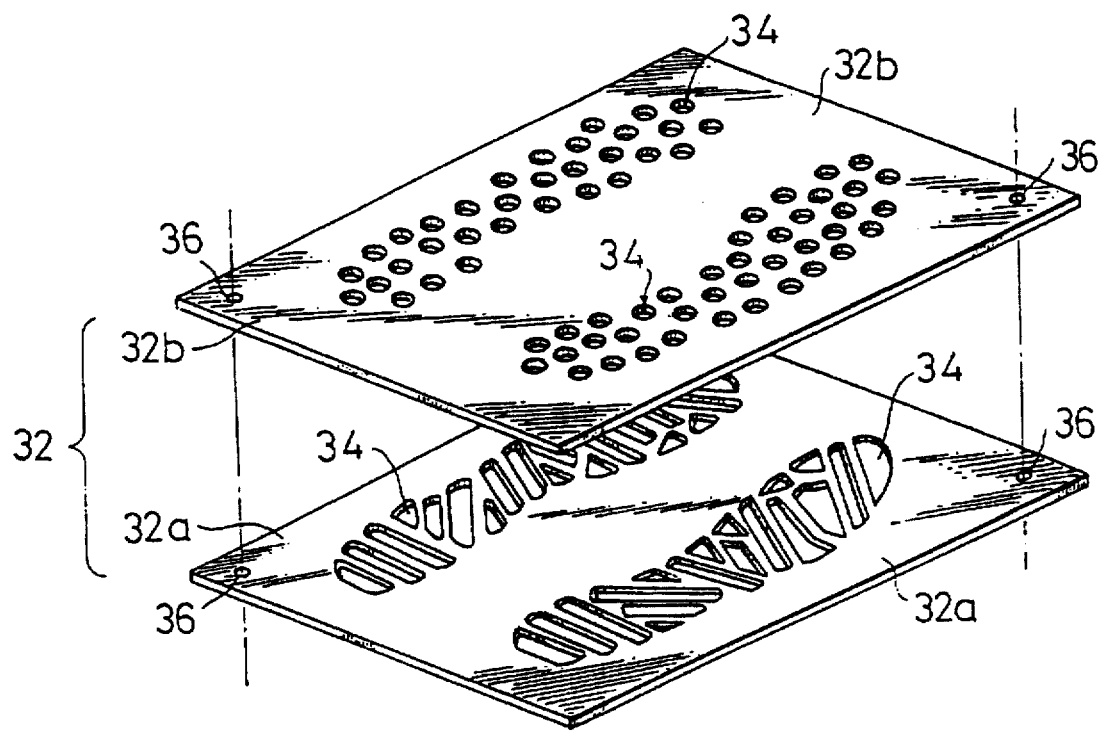
FIG. 5A is a perspective view showing perforated plates used for manufacturing a rugged shaped sheet of a two-layer structure according to one embodiment of the present invention.
Figure 7A:
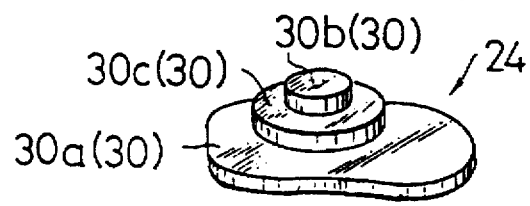
FIGS. 7A and 7B are perspective views showing a rugged pattern in which a difference in area between pattern elements is reduced and a rugged pattern in which the difference is increased, respectively.
Figure 7B:
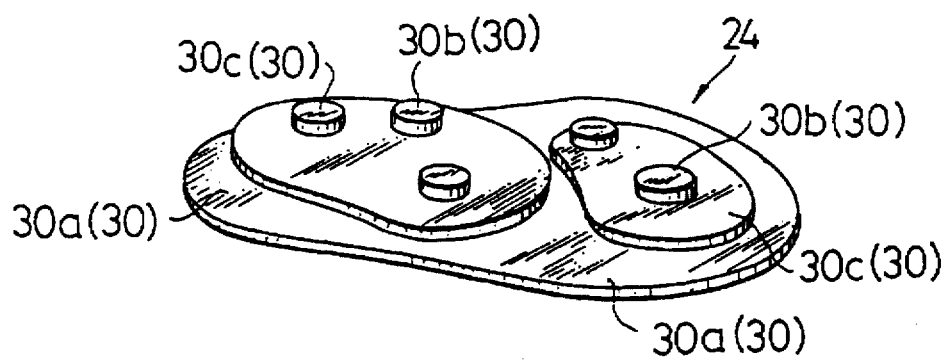

Thus, the base-side and ground-side perforated plate 32a and 32b are prepared. The perforated plates 32, as shown in FIG. 5A, each are formed with perforations 34 of a predetermined shape in a predetermined pattern-like manner in conformity to a configuration of the rugged pattern 24 to be formed and its layout. In general, it is required that a position of the perforations 34 is defined so as to be common to all the perforated plates 32. However, a size of the perforations of each perforated plate and a configuration thereof are determined depending on the corresponding pattern element 30 to be formed. In the illustrated embodiment, a plurality of perforated plates 32 are arranged while being kept tightly contacted with each other, so that it is advantageous to increase a contact area between the perforated plates 32 as large as possible. Therefore, in the illustrated embodiment, such a rugged pattern 24 as shown in FIG. 7A which is constructed so as to reduce a difference in area between pattern elements 30 is desirable as compared with a rugged pattern 24 as shown in FIG. 7B which is constructed so as to cause a difference in area between pattern elements 30 to be rendered relatively large.

Also, a plurality of the perforated plates 32 are used in the illustrated embodiment, therefore, it is convenient to provide each of the perforated plates with at least one guide hole 36. Also, it is preferable to employ any means for enhancing adhesion or tightness between the perforated plates 32.

Now, formation of adhesion between the perforated plates by means of magnetic force will be described hereinafter. Such formation of adhesion between the perforated plates 32 using magnetic force is carried out by providing one of a base 38 or the perforated plates 32 with magnetic force. First, the former case that magnetic force is provided on the side of the base 38 will be described. This is particularly convenient for practicing of the illustrated embodiment.

The base 38 may comprise, for example, an electromagnetic chuck which is conventionally widely used as a workpiece holding means in a surface grinding machine. The perforated plates 32 to be magnetically attracted by the base 38 each may comprise a relatively thin iron plate of such a thickness as described above. Alternatively, the base may comprise a permanent magnetic chuck, a permanent magnet or the like which exhibits a function similar to the electromagnetic chuck.

Figure 5B:
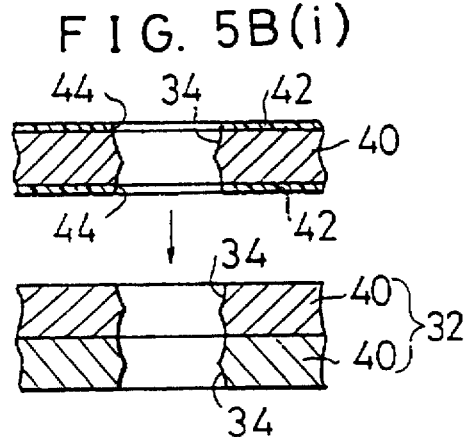
FIG. 5B (i) is a schematic fragmentary vertical sectional view showing a perforated plate comprising a combination of plural thin plate elements.
Figure 5B:
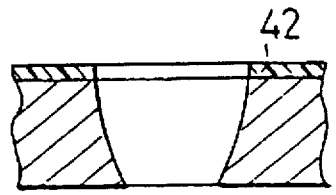
Figure 6:
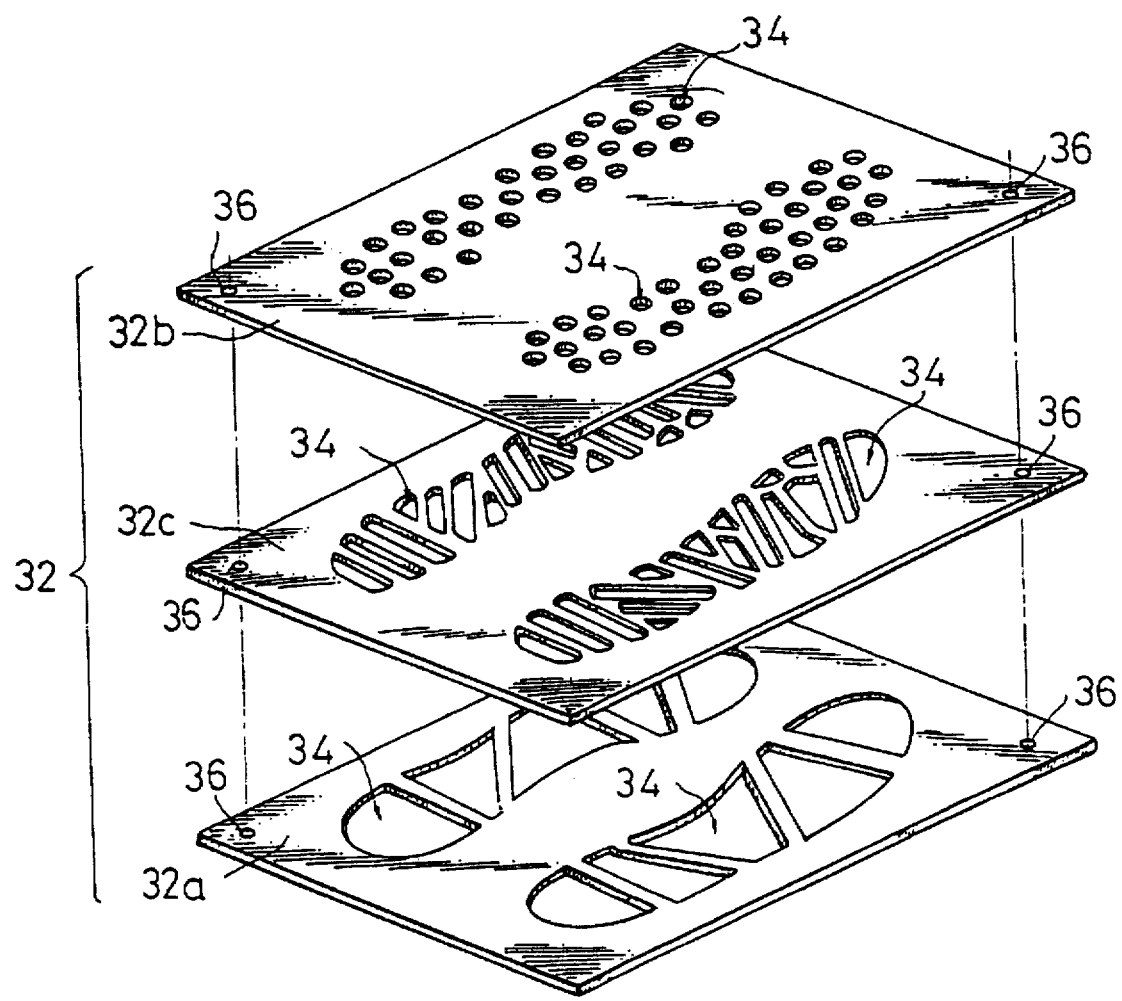
FIG. 6 is a perspective view showing perforated plates used for manufacturing a rugged shaped sheet of a three-layer structure according to another embodiment of the present invention.

As techniques for forming the perforated plate 32 with the perforations 34 there may be used, for example, etching. In this instance, as shown in FIG. 5B (i), a plurality of thin plate elements 40 which are blank materials for each of the perforated plates 32 are subjected to etching, to thereby be formed with perforations 34 in such a manner that a configuration of the perforations and a pattern thereof are common to the plate elements 40 for each perforated plate 32. The plate elements 40 thus formed with the common perforations 34 are laminated on each other as shown in FIG. 5B (i) to provide each perforated plate 32.

More particularly, when the perforated plate 32 of, for example, 1.6 mm in thickness is to be formed, two thin plate elements 40 each having a thickness of 0.8 mm are provided. Then, each of the plate elements 40 is covered on each of upper and lower surfaces thereof with a protection film 42 formed with guide holes 44 and then both surfaces of the plate element 40 are subjected to an etching treatment, to thereby be formed with the perforations 34. Then, adhesive such as epoxy adhesive or the like which is capable of forming a rigid adhesive layer is applied between the plate elements 40 to laminatedly join the plate elements 40 to each other, to thereby provide the perforated plate 32.

Such preparation of the perforated plate 32 from a plurality of the thin plate elements 40 permits a draft of the perforated plate formed to be substantially decreased as compared with a single thick plate element of which one surface is subjected to etching as shown in FIG. 5B (ii). An experiment made by the inventors indicated that subjecting both sides or surfaces of the plate element 40 to etching reduces the draft by half as compared with subjecting of only one surface of the plate element 40 to etching. Also, the draft is reduced with a decrease in thickness of the plate element 40. Such reduction of the draft facilitates introduction of the elastomer liquid material P into the perforations 34 of the perforated plate 32 and removal of the perforated plates 32 from the pattern elements 30 thus formed.

Also, subjecting both surfaces of the plate element 40 to etching permits a period of time required for the etching to be reduced as compared with subjecting only one surface of the plate element 40 to etching. In addition, use of the thin plate elements 40 eliminates a necessity of increasing accuracy with which the guide holes 44 are formed at the protection film 42. Thus, a period of time and a cost required for preparing the protection film 42 are significantly reduced.

Further, the above-described etching treatment reduces residual stress in the plate element as compared with a mechanical cutting treatment, to thereby minimize deformation of the plate elements 40 and therefore the rugged pattern 24 due to residual stress. This results in adhesion between the plate elements and/or between the perforated plates and the base 38 being improved, to thereby prevent leakage of the elastomer liquid material P.

Moreover, adhesion between the thin plate elements 40 by means of the adhesive for providing the perforated plate 32 permits rigidity of the perforated plate 52 thus formed to be increased as compared with the case that the perforated plate is formed of a single thick plate. Alternatively, formation of the perforations 34 may be carried out according to a procedure of using a master mold which is disclosed in Japanese Patent Application Laid-Open Publication No. 307574/1992, Japanese Patent Application Laid-Open Publication No. 343146/1992 and the like by the assignee, a procedure of employing a photo-setting resin film and a sandblasting method. Also, a method of treating a metal or plastic sheet by wire cutting, laser, punching, pressing or the like may be applied for this purpose.

Further, the illustrated embodiment may be constructed in such a manner that the perforated plates 32 laminated on each other are rendered different in magnetic characteristics, to thereby balance magnetic characteristics between the perforated plates. For example, this is carried out by arranging the perforated plates 32 so as to reduce magnetic characteristics of the perforated plate(s) on the side of the base sheet member 22 in turn and maximize magnetic characteristics of the uppermost perforated plate 32.

Figure 8A:
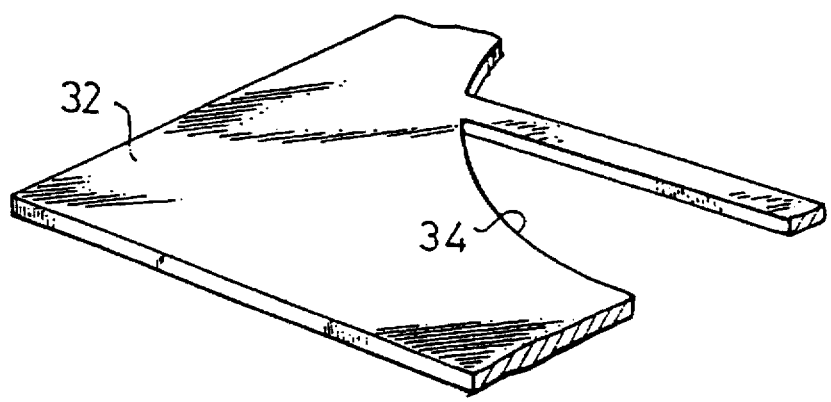
FIGS. 8A and 8B each are a fragmentary enlarged perspective view showing a perforated plate having an attracting means provided thereon.
Figure 8B:
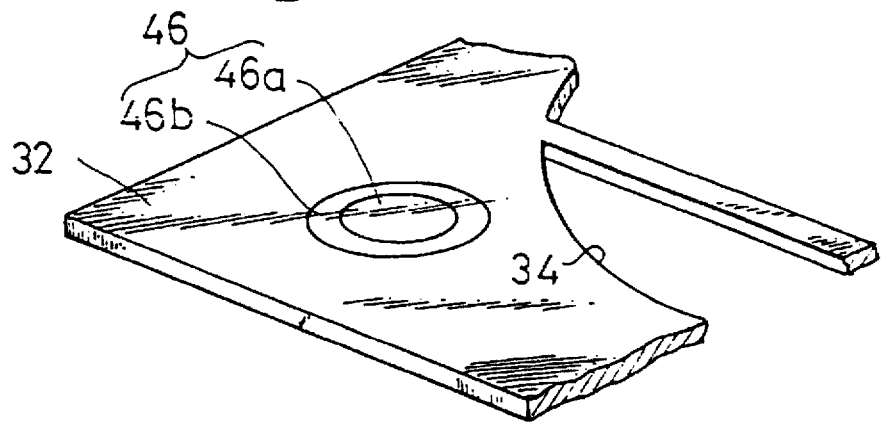

Now, the latter case that magnetic force is provided on the side of the perforated plates 32 will be described. In this instance, as the base 38 there may be used a plate-like or block-like magnetic member which is made of, for example, a metal material such as iron or the like. The perforated plates 32 each may be constructed as shown in FIGS. 8A or 8B. FIG. 8A shows the perforated plate 32 which is made of a permanent magnet. For this purpose, a plastic magnet may be conveniently used because of being readily shaped and suitable for mass-production. The plastic magnet is made of a mixture of a thermosetting or thermoplastic resin material and a magnetic power material such as ferrite or the like added to the resin material. Preferably, it is a rare earth type plastic magnet made by molding a mixture of a plastic material and a samarium-cobalt magnetic power material which is capable of effectively preventing its magnetic characteristics from being extensively deteriorated even when it is shaped in the form of a thin plate.

It would be considered that use of such a resin material for the perforated plate 32 causes the resin material and elastomer liquid material to be adhered together due to affinity therebetween. Therefore, any means of ensuring satisfactory removal of the perforated plate 32 from the pattern element 30 may be required. The means include a decrease in thickness of the perforated plate 32, use of a parting agent and the like.

FIG. 8B shows the perforated plate 32 which is provided at a portion thereof free of the perforations 34 with a magnetic attracting means 46. The magnetic attracting means 46 comprises a permanent magnet 46a and a non-magnetic ring 46b made of a non-magnetic material such as brass or the like and arranged so as to surround the permanent magnet 46a. Such arrangement of the magnetic attracting means 46 interrupts horizontal magnetic characteristics of the permanent magnet 46a which affect the perforated plate 32, so that the characteristics may be used for tightly joining the perforated plate to the perforated plate vertically adjacent thereto.

Thus, the construction shown in FIG. 8B enhances the magnetic characteristics of the attracting means 46. The permanent magnet may comprise a plastic magnet, a sintered magnet made of alnico alloy or ferrite, or the like.

Alternatively, adhesion between the perforated plates 32 may be carried out by spraying water between the perforated plates and then freezing it to join the perforated plates together. Also, a procedure of applying droplets of water or temporary liquid adhesive between the perforated plates or any mechanical adhesion means may be employed for this purpose. Moreover, the illustrated embodiment may be so constructed that the base sheet member 22 is interposedly arranged between the base-side perforated plate 32a and the base 38 constituted by a permanent magnet, to thereby be magnetically held therebetween. Such construction requires carrying magnetic metal on at least a surface of the perforated plate 32.

Preparation of Rugged Shaped Sheet

Now, preparation of the rugged shaped sheet of the present invention will be described in connection with both the pre-arrangement of the base sheet member and the post-arrangement of the base sheet member with reference to FIGS. 9A (i) to 10B and FIGS. 11A (i) to 13B.

1. Pre-arrangement of Base Sheet Member
(1) Setting of Base-side Perforated Plate (FIG. 2A and FIGS. 9A (i) and (ii))

First, setting of the base-side perforated plate 32a will be described with reference to FIGS. 2A and 9A. The base sheet member 22 is put on the base 38 and then the base-side perforated plate 32a for forming the base-side pattern element 30a is arranged on the base sheet member 22 and tightly joined to the base sheet member 22.

(2) Pouring of Elastomer Liquid Material

Figure 9A:
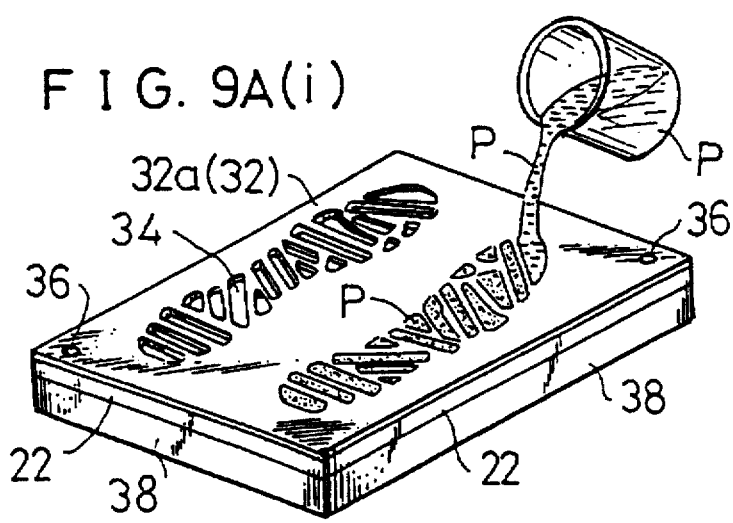
FIGS. 9A (i) and 9A (ii) each are a perspective view showing one example of formation of a base-side pattern element in a process of the present invention in which a base sheet member is previously arranged prior to formation of a rugged pattern.

Then, the elastomer liquid material P for forming the rugged pattern 24 is poured into the perforations 34 of the perforated plate 32a as shown in FIG. 9A (i). When a polyurethane elastomer is used as the elastomer liquid material P, two liquids constituting the material P are mixed together in a vessel to carry out deaeration prior to the pouring as shown in FIG. 9A (i). Also, the two liquids may be mixed in a cylinder by means of a static mixer widely used on an industrial scale and injected into the perforations through a nozzle. Alternatively, as shown in FIG. 9A (ii), the two liquids for the elastomer liquid material P may be sprayed toward the perforations 34 of the perforated plate 32 through nozzles while being mixed together.

The polyurethane elastomer may comprise a mixture of a prepolymer and polyisocyanate and is cured by heating. A polyurethane elastomer which is suitable for spraying through a nozzle includes a non-solvent fast-curing urethane resin material commercially available from Nippon Gosei Kagaku Kogyo Kabushiki Kaisha, Japan. The resin material is preferably kept heated prior to the spraying. This results in the material being cured in a gel time as short as 20 seconds. Also, to the elastomer liquid material P ther may be added a solvent for adjusting viscosity of the material, its hardness or the like. The polyurethane elastomer may further include a mixture of a prepolymer commercially available under a tradename "Nipporan" from Nippon Polyurethane Kogyo Kabushiki kaisha, Japan and polyisocyanate commercially available under a tradename "Pandex" from Dai-Nippon Ink Kabushiki Kaisha.

It may be required to prevent the elastomer liquid material P from flowing out of the perforated plate 32. For this purpose, it is preferable to incorporate a thickening agent in the material. Such a thickening agent includes, for example, a thickening agent manufactured by Nippon Aerosil Kabushiki Kaisha and sold under "AEROSIL" (registered trademark). The agent comprises silica ($SiO_2$) of a high purity (99.8%) and in the form of ultrafine particles of 7 to 50 μm. Also, it has a large surface area and high dispersion properties and is harmless. Addition of the thickening agent in a small amount permits rheological characteristics to be exhibited to a degree sufficient to be required for processing of a liquid material such as a polyester resin material, an epoxy resin material or the like. It is a matter of course that another filler material may be added to the elastomer liquid material P.

A photo-setting resin material may be used as the elastomer liquid material P as well. Now, the photo-setting resin will be described by way of an ultraviolet-setting resin material which is adapted to be cured for a short period of time by irradiation of ultraviolet rays.

An ultraviolet-setting resin material used for the present invention is desirably transparent or semitransparent both before and after curing so that ultraviolet rays may reach a bottom of the perforations 34 or the base-side pattern element 30a and a color of a pattern printed on the base sheet member 22 may be observed through the other pattern elements 30c and 30b. Also, the rugged pattern 24 is used for the shoe sole 26 in the illustrated embodiment; therefore, it is preferable that the ultraviolet-setting resin material used permits the rugged pattern 24 to exhibit satisfactory physical properties required for the shoe sole 26, such as, for example, elasticity, tensile strength, tearing strength, resistance to wear and the like. An increase in tearing strength may be carried out by adding a filler such as short fibers or the like to the ultraviolet-setting resin material in an amount which does not cause deterioration of curing of the resin.

(3) Squeegee Treatment

Figure 9B:
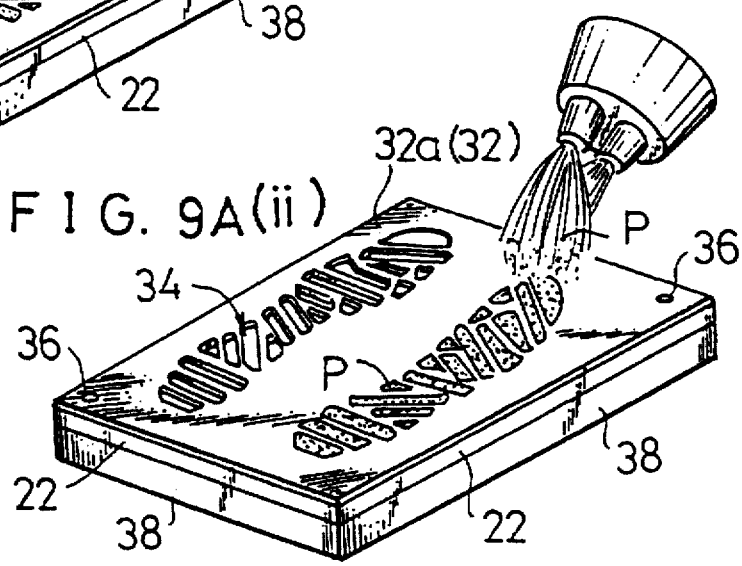
FIG. 9B is a perspective view showing a squeegee treatment carried out with respect to the base-side pattern element shown in each of FIGS. 9A (i) and 9A (ii)
Figure 9B:
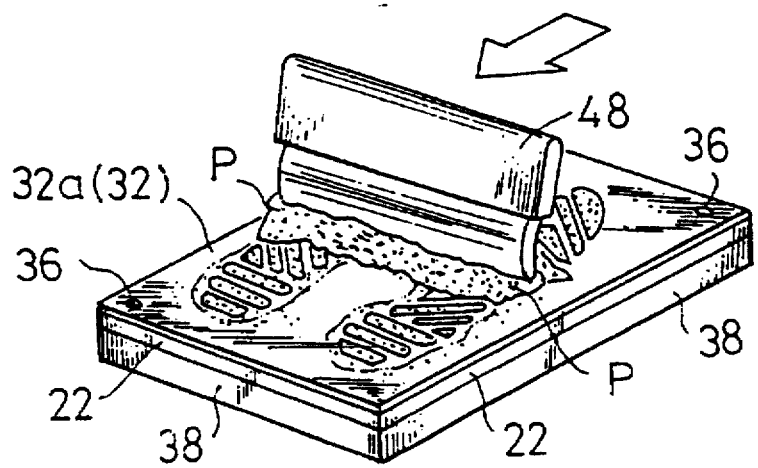

After a predetermined amount of elastomer liquid material P is poured into the perforations 34 of the perforated plate 32 (32a) as described above, a squeegee 48 is used to remove a portion of the elastomer liquid material P overflowing the perforations 34 as shown in FIG. 9B. Simultaneously, another portion of the liquid material P existing right under an upper surface of the perforations is removed while being dragged by a distal end of the squeegee 48, in view of surface tension of the liquid material, a contact angle between the liquid material P and the perforations 34 of the perforated plate 32 or the distal end of the squeegee 48, wetting of the squeegee 48, or the like.

(4) Setting of Ground-side Perforated Plate, Pouring of Elastomer Liquid Material into Perforated Plate, Squeegee Treatment (FIGS. 10A and 10B)

At the time when the elastomer liquid material P thus charged in the perforations 34 of the perforated plate 32 (32a) is semicured to a degree sufficient to permit the perforated plate to be somewhat released or removed from the liquid material P and prevent peeling or separation between the pattern elements 30 to be joined together, the ground-side perforated plate 32b is arranged on the base-side perforated plate 32a. Then, pouring of the elastomer liquid material P and the squeegee treatment described above are carried out with respect to the perforated plate 32b and thereafter the elastomer liquid material is cured to a degree sufficient to prevent such separation as described above between the pattern elements 30.

The squeegee treatment permits an upper surface of the elastomer liquid material P to be formed into a concave shape. Formation of such a concave shape is accomplished without any specific squeegee and/or squeegeeing procedure. For example, this may be readily attained by gently carrying out a conventional squeegee treatment using the elastomer liquid material P and squeegee 48 described above. Also, a degree of depression formed on the upper surface of the elastomer liquid material P depends on factors such as surface tension of the liquid material, a contact angle between the liquid material P and the perforations 34 of the perforated plate 32 or the distal end of the squeegee 48, wetting of the squeegee 48 or the like, rather than squeegeeing techniques employed. Therefore, determination of such factors affects the depression. A surface of the pattern element which has been subjected to the squeegee treatment constitutes the above-described ground surface 24a of the rugged pattern 24.

(5) Removal of Perforated Plate

When the elastomer liquid material P poured into the perforations 34 of the perforated plates 32 is semicured as described above, removal of the perforated plates is carried out from the ground-side perforated plate 32b to the base-side perforated plate 32a in order. Then, the elastomer liquid material P is completely cured, resulting in the rugged shaped sheet 20 as shown in FIG. 1 being formed wherein the rugged pattern 24 of a multi-layer structure is arranged on the base sheet member 22.

2. Post-arrangement of Base Sheet Member (1) Setting of Air-permeable Sheet (FIG. 2B)

First, setting or arrangement of an air-permeable sheet 50 on the base 38 will be described with reference to FIG. 2A. The breathable or air-permeable sheet 50 is merely required to function to exhibit air permeability sufficient to permit air which entered the perforations 34 of the perforated plate 32 to be outwardly discharged from the perforations 34. Therefore, the air-permeable sheet 50 may be constructed so as to permit air to pass through a tissue of the sheet 50. Alternatively, it may be so constructed that air is kept remaining in recesses on a surface of the sheet 50 or cavities in the tissue of the sheet 50.

The air-permeable sheet 50 may be formed of a continuous air-permeable material such as a nonwoven fabric material, a sponge material, a frosted film such as a polyethylene film formed thereon with unevenness for eliminating luster or the like, as well as a film subjected to fine embossing or the like. Use of the continuous air-permeable material such as a nonwoven fabric material, a sponge material or the like for the air-permeable sheet 50 permits air entering the perforations 34 of the perforated plate 32 to be outwardly discharged through the air-permeable sheet 50 and/or enter the cavities within the tissue of the air-permeable sheet 50; whereas use of the frosted film or the film subjected to fine embossing for the sheet 50 permits the air to enter in the recesses formed on the surface of the air-permeable sheet 50, to thereby promote outward discharge of the air. Also, when the air-permeable sheet 50 is tightly contacted with the perforated plate 32, a parting agent is used to facilitate releasing of the air-permeable sheet 50 from the elastomer liquid material P and the perforated plate 32. Alternatively, the air-permeable sheet 50 may be made of a material which exhibits release characteristics, to thereby eliminate use of the parting agent.

Alternatively, the perforated plate 32 may be arranged directly on the base 38 without interposing the air-permeable sheet 50 therebetween. In this instance, it is convenient that a parting agent is previously applied to the base 38 in order to facilitate release of the base 38 from the elastomer liquid material P.

Figure 11A:
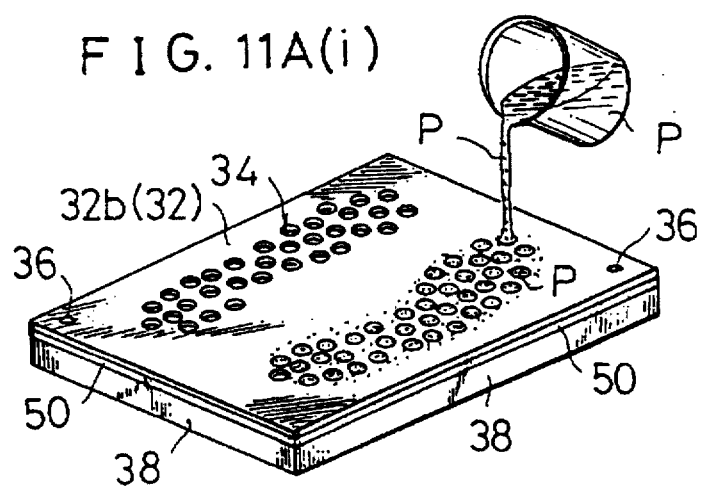
FIGS. 11A (i) and 11A (ii) each are a perspective view showing another example of formation of a ground-side pattern element in a process of the present invention in which a base sheet member is arranged after formation of a rugged pattern.
Figure 11A:
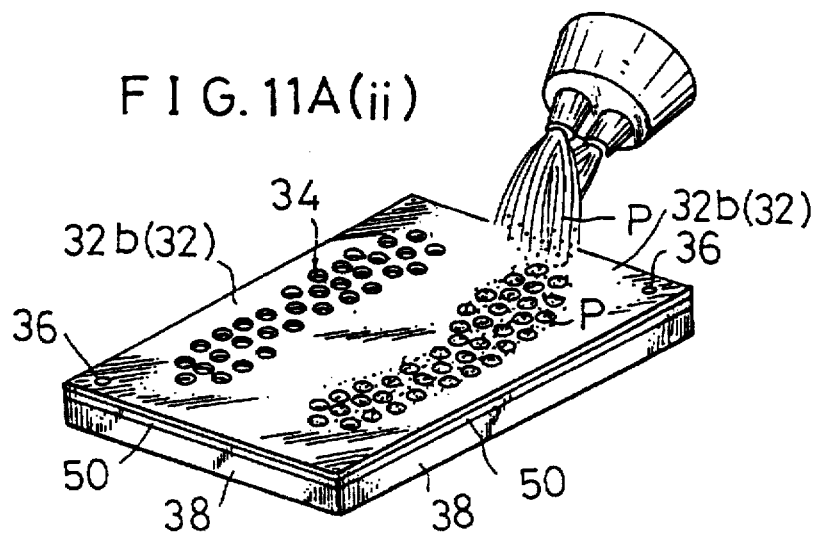

(2) Setting of Ground-side Perforated Plate, Pouring of Elastomer Liquid Material, Squeegee Treatment (FIGS. 11A (i) to 11B)

Then, the ground-side perforated plate 32b is arranged or set on an upper surface of the air-permeable sheet 50 or an upper surface of the base 38 to which the parting agent is applied. Thereafter, the elastomer liquid material P is poured into the perforations 34 of the ground-side perforated plate 32b as in "1. Pre-arrangement of Base Sheet Member" described above when a polyurethane elastomer is used as the elastomer liquid material P, two liquids constituting the elastomer liquid material P are mixed in a vessel to carry out defoaming prior to the pouring as shown in FIG. 11A (i). Also, the two liquids may be mixed in a cylinder by means of a static mixer widely used on an industrial scale and injected into the perforations through a nozzle. Alternatively, as shown in FIG. 11A (ii), the two liquids for the elastomer liquid material P may be sprayed toward the perforations 34 through nozzles while being mixed together.

Figure 11B:
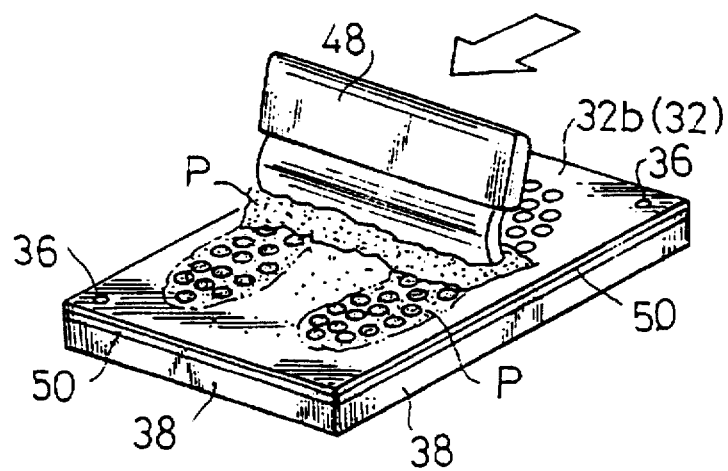
FIG. 11B is a perspective view showing a squeegee treatment carried out with respect to the ground-side pattern element shown in each of FIGS. 11A (i) and 11A (ii)

After a predetermined amount of elastomer liquid material P is poured into the perforations 32 of the perforated plate 32b as described above, a squeegee 48 is used to remove a portion of the elastomer liquid material P overflowing the perforations 34 as shown in FIG. 11B.

Figure 12A:
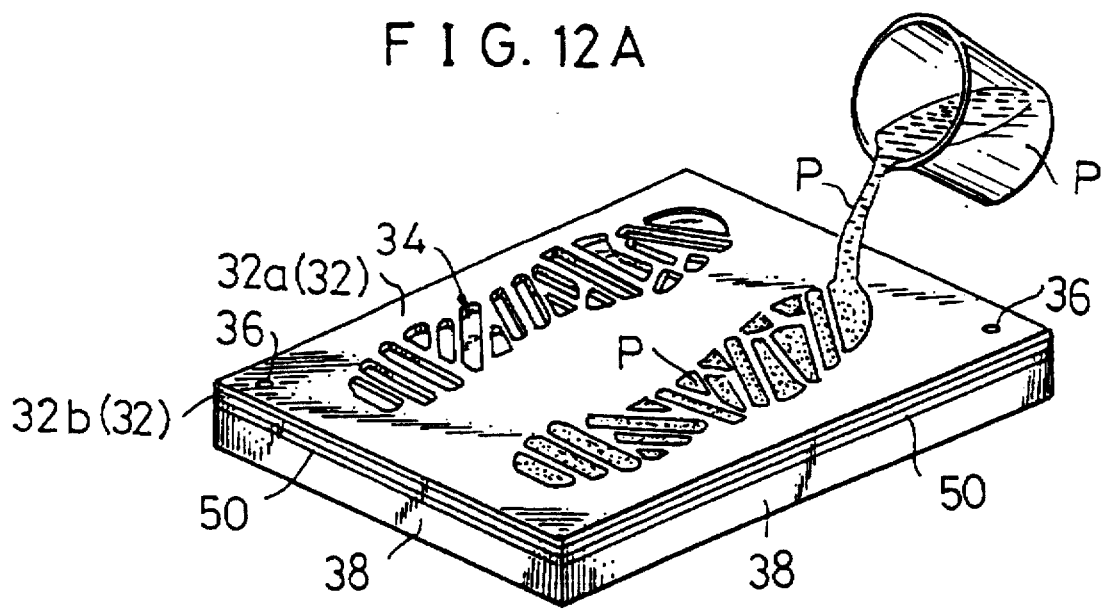
FIG. 12A is a perspective view showing another example of formation of a base-side pattern element in a process of the present invention in which a base sheet member is arranged after formation of a rugged pattern.
Figure 12B:
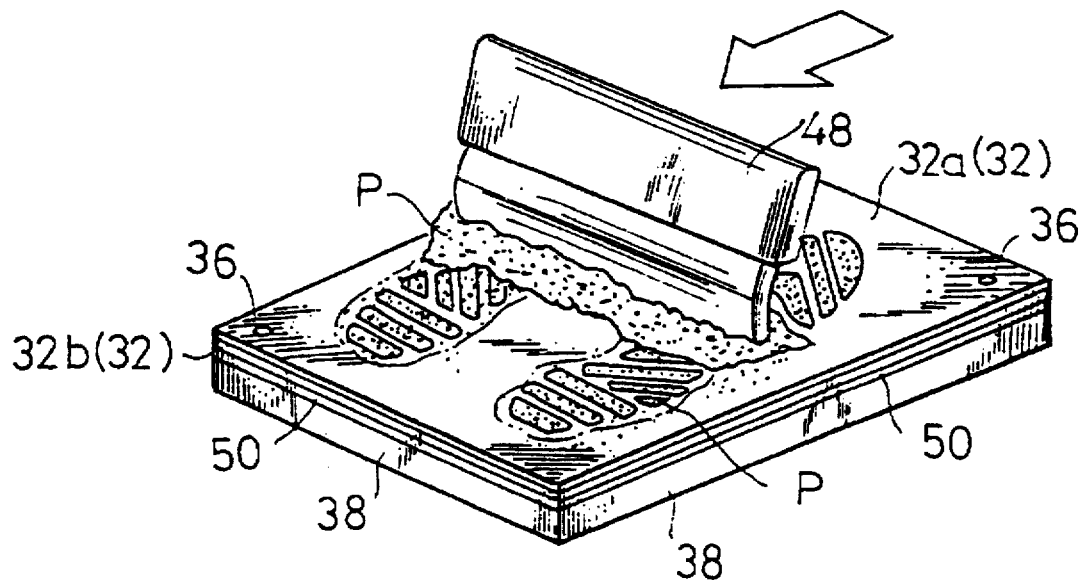
FIG. 12B is a perspective view showing a squeegee treatment carried out with respect to the base-side pattern element shown in FIG. 12A.

(3) Setting of Ground-side Perforated Plate, Pouring of Elastomer Liquid Material into Perforated Plate, Squeegee Treatment (FIGS. 12A and 12B)

Then, at the time when the elastomer liquid material P thus charged in the perforations 34 of the perforated plate 32 (32a) is semicured as in "1. Pre-arrangement of Base Sheet Member" described above, the ground-side perforated plate 32b is arranged or set on the base-side perforated plate 32a. Subsequently, pouring of the elastomer liquid material P and a squeegee treatment are carried out in a manner like the above.

Figure 13A:
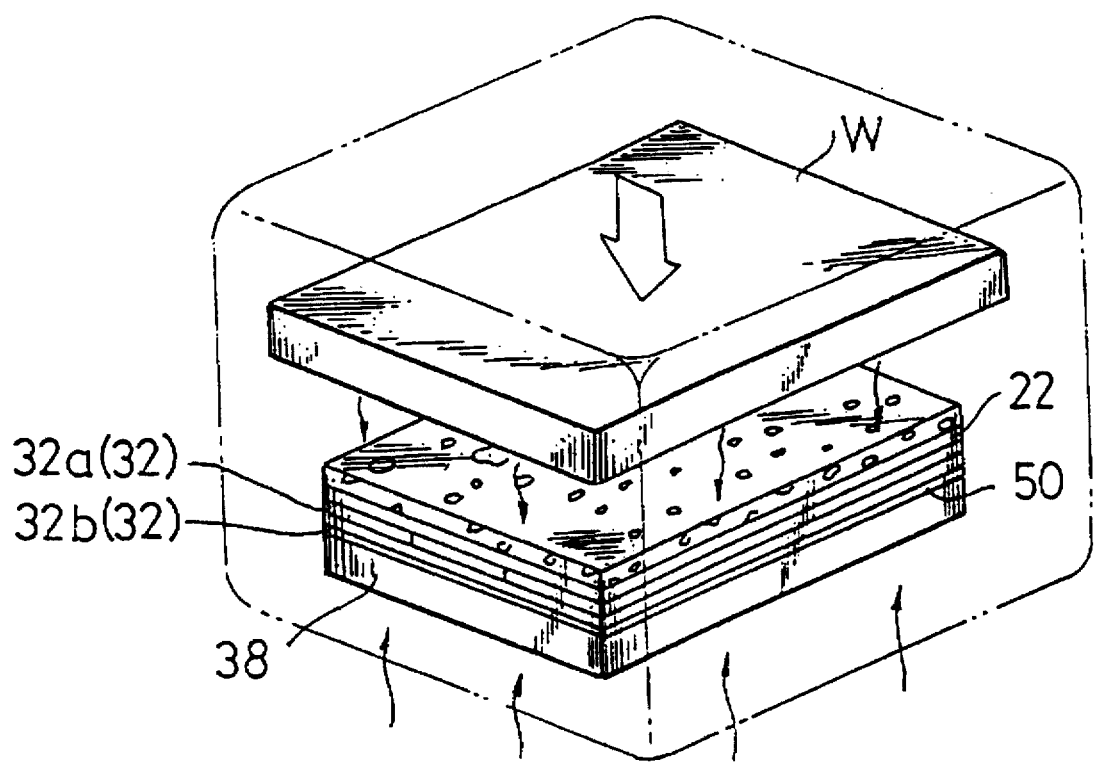
FIGS. 13A and 13B are perspective views showing joining of a rugged pattern to a base sheet member and removal of the rugged pattern from perforated plates, respectively.
Figure 13B:
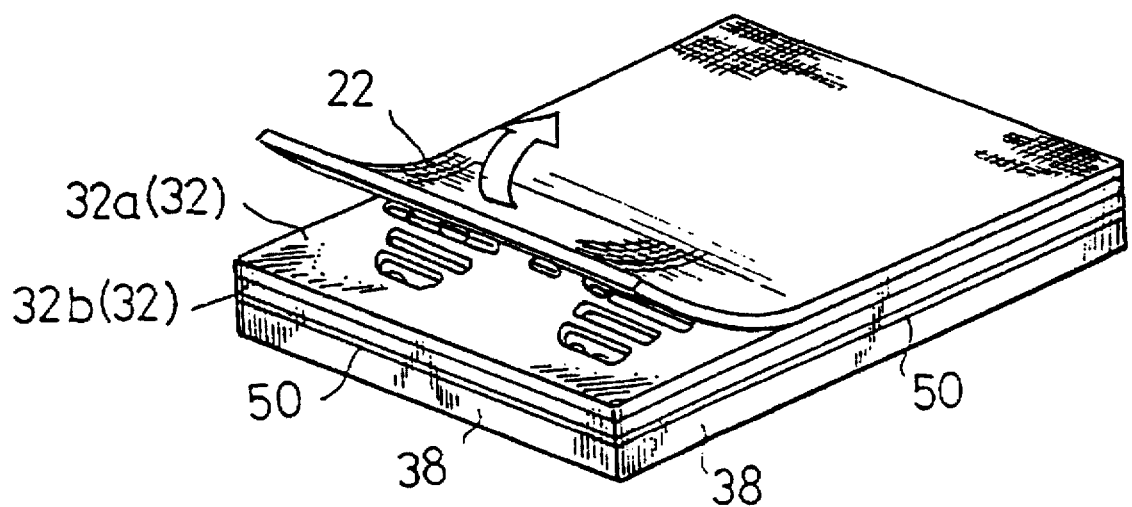

(4) Setting of Base Sheet Member, Pressing/Curing, Removal of Perforated Plate (FIGS. 13A and 13B)

After the pouring and squeegee treatment of the elastomer liquid material P are carried out as described above, the base sheet member 22 is set on an upper surface of the base-side perforated plate 32a. Then, a weight W is put on the base sheet member 22 to press the member 22, to thereby adhere the base sheet member 22 to the base-side perforated plate 32a and cure the elastomer liquid material P in the perforations 34 of the perforated plate to a degree sufficient to permit removal of the perforated plate. Then, the weight W is upwardly removed and the base sheet member 22 is drawn up to fully cure the elastomer liquid material P as shown in FIG. 13B, resulting in such a rugged shaped sheet 20 as shown in FIG. 1 being prepared. Such a procedure minimizes or prevents deterioration of contrast between the ground-side pattern element 30a and the ground-side pattern element 30b due to squeeze-out of the base-side pattern element 30a. The above-described pressing of the base sheet member may be carried out using a press unit in place of the weight W, to thereby promote pressing of the base sheet member 22 against the rugged pattern 24.

3. Separate Practicing of Formation of Base Layer and Ground Layer

The following procedure may be employed as an intermediate procedure between "1. Pre-arrangement of Base Sheet Member" and "2. Post-arrangement of Base Sheet member" described above.

(1) Formation of Base Layer

Figure 14A:
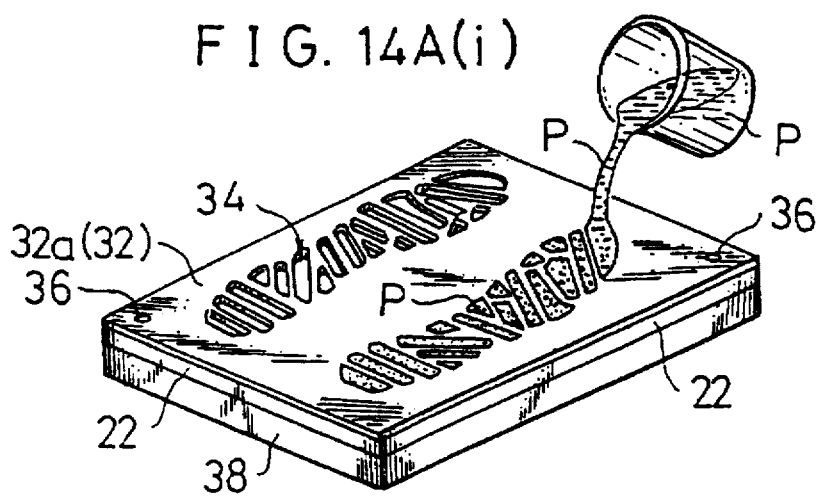
FIGS. 14A (i) and 14A (ii) are perspective views showing formation of a base layer and formation of a ground layer which are carried out separately, respectively.
Figure 14A:
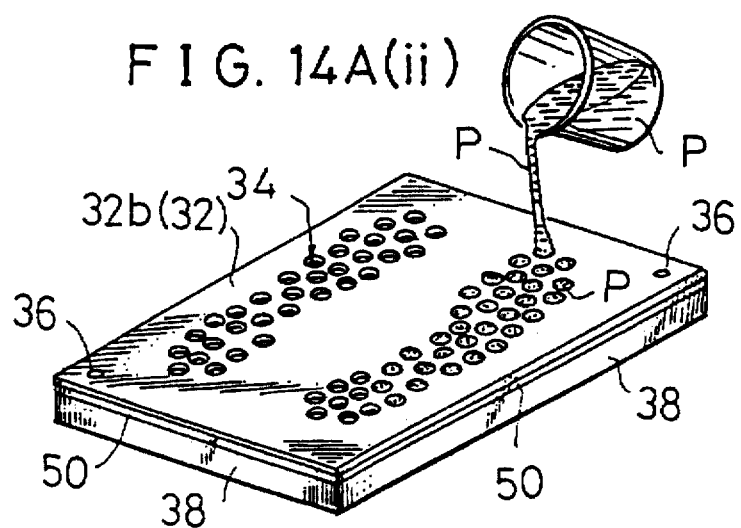
Figure 14B:
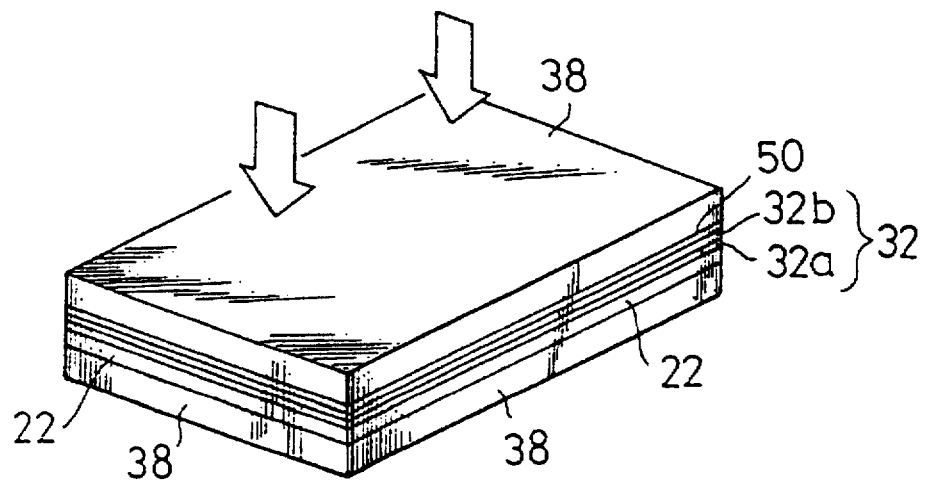
FIG. 14B is a perspective view showing joining between the base layer and the ground layer shown in FIGS. 14A (i) and 14A (ii).

As shown in FIGS. 14A (i) to 14B, two bases 38 are prepared. On one of the bases 20 is set the base sheet member 22 as in "1. Pre-arrangement of Base Sheet Member" described above, and then the base-side perforated plate 32a is set on the base sheet member 22. Subsequently, the elastomer liquid material P is poured into the perforations 34 of the base-side perforated plate 32a and then a portion of the liquid material P overflowing the perforations 34 is removed by means of a squeegee 48, to thereby form a base layer as shown in FIG. 14A (i).

(2) Formation of Ground layer

On the other base 38 is set the air-permeable sheet 50 as "2. Post-arrangement of Base Sheet member" described above and then the ground-side perforated plate 32b is arranged on the air-permeable sheet 50. Alternatively, when the perforated plate 32 is directly arranged on the base 38 without using the air-permeable sheet 50, a parting agent is applied to the base 38. Then, the ground-side perforated plate 32b is arranged on the base 38. Thereafter, the elastomer liquid material P is poured into the perforations 34 of the ground-side perforated plate 32b and then a portion of the liquid material P overflowing the perforations 34 is removed by means of a squeegee 48, to thereby form a ground layer as shown in FIG. 14A (ii).

(3) Joining between Base layer and ground Layer

Subsequently, at the time when the elastomer liquid material P for each of the base layer and ground layer is semicured, the ground layer is arranged on the base layer and a pressure is downwardly applied to a combination of the base layer and ground layer to cure the elastomer liquid material P to a degree sufficient to permit removal of the perforated plates.

Then, the ground-side perforated plate 32b and base-side perforated plate 32a are removed in turn, to thereby fully cure the elastomer, resulting in such a rugged shaped sheet 20 as shown in FIG. 20 being prepared.

The intermediate procedure described above permits the base layer and ground layer to be concurrently formed, to thereby contribute to an increase in productivity.

Formation of an intermediate layer by means of the intermediate perforated plate 32c may be carried out by arranging the intermediate plate between the base-side perforated plate 32a and the ground-side perforated plate 32b and the elastomer liquid material P is poured into the perforations 34 of the intermediate perforated plate 32c, followed by a squeegee treatment, to thereby form the intermediate layer.

Application of the rugged shaped sheet 20 of the present invention is not limited to a sole of sports shoes. For example, it may be effectively applied to stripes for design or reinforcement provided on an upper part of sports shoes; a grip for a bicycle, a tennis racket and a badminton racket; a saddle for a bicycle; a non-slip member for a snow board and a surfboard; a glove for athletics or sports such as baseball, soccer and bicycle racing; a grip for various kinds of tools; a grip for a camera and a video camera; and the like.

As can be seen from the foregoing, the rugged shaped sheet of the present invention is so constructed that the rugged pattern is constituted by the plural pattern elements which are formed so as to be different in at least one of size, configuration and properties from each other, resulting in being constructed into a multi-layer structure. Such construction permits the rugged pattern to be provided thereon with a strip- or stripe-like color design when different colors are applied to the pattern elements, respectively, to thereby improve aesthetic properties of the rugged shaped sheet. Also, when the pattern elements of the rugged pattern are formed so as to be different in size or combination of size and configuration from each other, resulting in the rugged pattern being formed into a stepwise configuration, the rugged pattern may be formed into a more complicated configuration sufficient to further improve the aesthetic properties.

Also, in the process of the present invention, the rugged pattern is successively formed from the base side or ground side, so that the properties, size and/or configuration of the pattern elements may be varied as required, resulting in the rugged shaped sheet of a complicated configuration required to provide non-slip properties being manufactured with ease and at a reduced cost.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A process for manufacturing a rugged shaped sheet comprising the steps of:

arranging, on a base, perforated plates formed with perforations of a predetermined shape in a pattern-like manner;

pouring an elastomer liquid material into the perforations of each of the perforated plates, followed by a squeegee treatment;

arranging a base sheet member on the perforated plates and holding the former on the latter while downwardly pressing, leading to curing of the elastomer liquid material; wherein the perforated plates include at least a base-side perforated plate and a ground-side perforated plate;

the ground-side perforated plate is and charged with the elastomer liquid material in a predetermined amount;

the elastomer liquid material poured in the ground-side perforated plate is subjected to the squeegee treatment and then semicured, leading to formation of a ground layer; and a base layer is laminated on the ground layer.

2. A process as defined in claim 1, wherein lamination of the base layer on the ground layer is carried out by arranging the base-side perforated plate on the ground layer at the time when the ground layer is formed and arranging the base sheet member on the base layer at the time when the elastomer liquid material is semicured to form the base layer.

3. A process as defined in claim 2, wherein the perforated plates further include at least one intermediate perforated plate likewise formed with perforations;

the intermediate perforated plate being arranged on the ground layer after formation of the ground layer;

the elastomer liquid material being poured into the perforations of the intermediate perforated plate, subjected to a squeegee treatment and semicured, resulting in forming an intermediate layer; and the base-side perforated plate being arranged on the intermediate layer thus formed, to thereby form the ground layer.

4. A process as defined in claim 1, wherein lamination of the base layer on the ground layer further includes arrangement of an intermediate product formed by laminating an additional base layer on an additional base sheet member in a different step on the ground layer at the time when the ground layer is formed.

5. A process as defined in claim 4, wherein the perforated plates further include at least one intermediate perforated plate likewise formed with perforations;

the intermediate perforated plate being arranged on the ground layer after formation of the ground layer;

the elastomer liquid material being poured into the perforations of the intermediate perforated plate, subjected to a squeegee treatment and semicured, resulting in forming an intermediate layer; and the base-side perforated plate being arranged on the intermediate layer thus formed, to thereby form the ground layer.

6. A process as defined in claim 4, wherein the perforations of each of the perforated plates are formed by etching.

7. A process as defined in claim 1, wherein the perforated plates further include at least one intermediate perforated plate likewise formed with perforations;

the intermediate perforated plate being arranged on the ground layer after formation of the ground layer;

the elastomer liquid material being poured into the perforations of the intermediate perforated plate, subjected to a squeegee treatment and semicured, resulting in forming an intermediate layer; and the base-side perforated plate being arranged on the intermediate layer thus formed, to thereby form the ground layer.

8. A process as defined in claim 7, wherein the perforations of each of the perforated plates are formed by etching.

9. A process as defined in claim 1, wherein the perforations of each of the perforated plates are formed by etching.

10. A process as defined in claim 2, wherein the perforations of each of the perforated plates are formed by etching.

* * * * *